United States Patent Office 3,369,052
Patented Feb. 13, 1968

3,369,052
PRODUCTION OF CYCLIC ALKENE
Frederick Harold Howell, Maghull, and Wilfred Pickles, Hazel Grove, England, assignors to Geigy Chemical Corporation, Ardsley, N.Y., a corporation of New York
No Drawing. Continuation-in-part of application Ser. No. 405,838, Oct. 22, 1964. This application Dec. 5, 1966, Ser. No. 598,924
Claims priority, application Great Britain, Oct. 29, 1963, 42,632/63
5 Claims. (Cl. 260—666)

ABSTRACT OF THE DISCLOSURE

Cyclododecene is produced from cyclododecatriene in at least 80% yield by heating cyclododecatriene to a temperature of 130–180° C. at atmospheric pressure without solvent, catalysing the reaction with a palladium hydrogen catalyst.

---

This application is a continuation-in-part of our application Ser. No. 405,838, filed Oct. 22, 1964; now abandoned.

The present invention relates to the production of unsaturated cycloaliphatic organic compounds and particularly to the production of a cycloalka-mono-ene from a more highly unsaturated cyclic alkene.

More particularly, this invention relates to the production of cyclododecene from cyclododecatriene.

Cyclododecene is a useful intermediate in the production of other valuable organic compounds.

Cyclododecene may be oxidised by known methods at the ethylenic double bond to produce 1:12-dodecanedioic acid, esters of which are of value as plasticisers or as constitutents of synthetic lubricants or other functional fluids.

Cyclododecene can be produced in various ways, but generally with very low yields, for instance, by ring condensation and reduction, the yield rate being about 0.5%. Partial hydrogenation of cyclododecatriene recommends itself in view of the industrial availability of the triene. However, in doing so the problem arises how to obtain a satisfactory cyclododecene content in the resulting mixed hydrogenation product which consists essentially of fully hydrogenated cyclododecane, the desired cyclododecene, cyclododecadiene and unreacted cyclododecatriene.

For the above-stated purposes, cyclododecene should be present in the reaction product preferably in amounts of 90% by weight, or higher, but lower contents, above about 80% by weight, are also acceptable if the content of diene and unreacted triene does not exceed 10 to 15% by weight. Otherwise, the workup of the reaction product becomes too involved.

A process for the selective hydrogenation of cyclododecatriene to cyclododecene has already been proposed, Wiese et al., U.S. Patent 3,022,359. This known process employs a high surface area catalyst in combination with a displacement solvent to achieve the desired selective hydrogenation. The source of hydrogen in the Wiese et al. process may be gaseous hydrogen, a hydrogen transfer agent or a mixture thereof. However this known process in order to achieve satisfactory selectivity, employs only a secondary alcohol hydrogen transfer agent as the hydrogen source since such a hydrogen transfer agent is converted to a ketone and the ketone then acts as a displacement solvent. As high surface area catalysts to be used in combination with the hydrogen transfer agent there are named, primarily, Raney nickel, and further nickel deposited on kieselguhr, alumina or silica; as well as iron, cobalt, copper, palladium, platinum, molybdenum, tungsten and chromium.

The data in the aforesaid U.S. patent show clearly that high selectivity to cyclododecene combined with a high conversion of cyclododecatriene starting-material is only achieved when a secondary alcohol is used as the sole source of hydrogen in combination with nickel as catalyst and when the reaction is effected under high pressure. In those experiments carried out solely for comparative purposes in which Wiese et al. used only gaseous hydrogen as the hydrogen source, a nickel or platinum catalyst and no displacement solvent, very unsatisfactory selectivity to cyclododecene was achieved, the best result being 56% selectivity to cyclododecene. Furthermore, in order to achieve even this poor level of selectivity to cyclododecene, superatomspheric pressure was employed.

We have now found that unexpectedly cyclododecatriene can be hydrogenated to cyclododecene with a selectivity in excess of 90% by weight and with substantially complete conversion by carrying out selective hydrogenation at atmospheric pressure and a temperature within the range of from 130° to 180° C. using gaseous hydrogen only as the hydrogen source and a palladium catalyst.

Other catalysts such as nickel, cobalt, iron, copper, platinum, rhodium or ruthenium will not afford satisfactory results.

The novel process according to the invention is much simpler than previously known processes in that (a) It does not require the use of a solvent, particularly a displacing solvent and/or a hydrogen transfer agent which is expensive and cannot be recovered in its original form and therefore cannot be re-cycled, and (b) It does not require the use of expensive and possibly dangerous pressure equipment.

The present invention accordingly provides a hydrogenation process for the conversion of cyclododecatriene to cyclododecene in yields of at least 80% by weight which comprises heating cyclododecatriene with molecular hydrogen at a temperature in the range of from 130° to 180° C. at substantially atmospheric pressure, catalysing the reaction with a palladium hydrogenation catalyst in the absence of solvent.

The selective hydrogenation process of this invention is carried out by contacting the cyclododecatriene with the gaseous hydrogen at atmospheric pressure in the presence of the catalyst, at a temperature in the above-given critical range of from 130° to 180° C., a temperature of about 150° C. being preferred in achieving the highest selectivity, i.e., greater than 90% to cyclododecene. For optimum yields of cyclododecene, the amount of gaseous hydrogen which is employed is substantially two molecular proportions per molecular proportion of cyclododecatriene starting-material in order that sufficient hydrogen is available to fully saturate two of the unsaturated bonds and that an excess of hydrogen is not available to attack the third unsaturated bond of the cyclododecatriene molecule.

The cyclododecatriene starting material can exist in a number of stereo-isomeric forms, the process of the invention not being limited to the hydrogenation of a particular stereo-isomer.

The cyclododeca 1:5:9-triene for use in the process of the invention may be the trans:trans:trans isomer or the cis:trans:trans isomer or either of the other possible isomeric forms. The cyclododecatriene can be a pure or substantially pure compound, but it can also be a mixture of two or more stereo isomers, with or without other organic compounds, such mixtures being generally cheaper or more readily available starting materials, or in the form of a mixture with impurities or diluents; these impurities or diluents should, however, not inhibit the activity of the catalyst or otherwise have a deleterious effect on the course of the hydrogenation.

The palladium catalyst for the hydrogenation process of this invention can be unsupported palladium metal, for instance palladium black, or palladium oxide or a supported palladium catalyst, preferred supports being: charcoal, alumina, asbestos, pumice, an alkaline earth metal carbonate or sulphate, the atom number of which ranges from 40 to 60 inclusive, for instance calcium carbonate or barium sulphate, charcoal being particularly preferred. The palladium content of the catalyst should be about one-tenth or higher in the case of unsupported catalyst, and should amount to about 1% to 10% by weight, based on the total catalyst weight in the case of the supported catalyst. The proportion of palladium metal employed as catalyst in the process of this invention is preferably within the range of from 0.01% to 0.1% by weight based on the weight of cyclododecatriene starting material.

The presence of an added organic solvent is not necessary under the conditions of the process of the instant invention in order to achieve high yields of cyclododecene.

The partial hydrogenation product obtained by the process according to the invention can be used directly in the production of 1:12-dodecanedioic acid of a satisfactory degree of purity.

The following non-limitative examples further illustrate the present invention. Parts by weight shown therein bear the same relation to parts by volume as do kilograms to liters. Percentages are expressed by weight unless otherwise stated.

Example 1

3.32 parts by weight of cis:trans:trans-cyclododeca-1:5:9-triene and 0.015 part by weight of a 5% palladium/charcoal catalyst (Type 17 catalyst, Johnson, Matthey and Co. Ltd., London) were placed in a reactor from which the air present was evacuated. The reactor was then heated to 130° C. and maintained at that temperature. Hydrogen was admitted to the reactor at atmospheric pressure and the reactor was shaken until 2 moles of hydrogen had been taken up per mole of the cyclododeca-1:5:9-triene.

The hydrogen supply was then disconnected and residual hydrogen atmosphere was removed from the reactor. The reactor contents were allowed to cool to 20° C.; the catalyst was then filtered off and the iodine value of the filtrate was determined. The filtrate was also analysed by gas/liquid chromatography. The total hydrogenation product amounted to 3.40 parts by weight. The results are given in Table 1 following Examples 2 to 5.

Examples 2 to 5

The procedure described in Example 1 was carried out using different reaction temperatures, namely 140°, 150°, 160° and 170° C., the reactants, catalyst and reaction conditions being otherwise the same as in the preceding example.

The iodine values and gas/liquid chromatographic analysis of the hydrogenation product obtained were determined and the results are given in the following Table 1, together with those of Example 1 and those of five comparative hydrogenations carried out by the same procedure except that reaction temperatures outside these specified in the present invention were used, namely 20°, 50°, 100°, 120° and 200° C.

TABLE 1

| | Reaction temperature, ° C. | Iodine value | Percent composition ||||
|---|---|---|---|---|---|---|
| | | | Cyclododecane | Cyclododecene | Cyclododecadiene | Cyclododecatriene |
| Comparative runs: | | | | | | |
| 1 | 20 | 160 | 24.4 | 48.3 | 26.0 | 1.4 |
| 2 | 50 | 160 | 19.4 | 57.6 | 21.2 | 1.7 |
| 3 | 100 | 155 | 14.2 | 70.7 | 14.4 | 0.7 |
| 4 | 150 | 157 | 15.1 | 67.4 | 16.8 | 0.7 |
| 5 | 200 | 160 | 12.4 | 70.7 | 16.7 | |
| Example 1 | 130 | 152 | 10.7 | 79.6 | 9.7 | |
| Example 2 | 140 | 150 | 11.0 | 80.2 | 8.8 | |
| Example 3 | 150 | 147 | 6.6 | 90.6 | 2.7 | |
| Example 4 | 160 | 151 | 8.7 | 84.3 | 7.0 | |
| Example 5 | 170 | 148 | 9.5 | 84.6 | 5.9 | |

The data in Table 1 demonstrate that in order to achieve selectivities to cyclododecene of 80% by weight, a temperature in the range of from about 130° to about 180° C. is necessary.

Example 6

The procedure described in Example 1 was carried out using trans:trans:trans-cyclododeca-1:5:9-triene instead of the cis:trans:trans isomer; the reaction temperature was 150° C., the catalyst and the reaction conditions otherwise being the same.

The iodine value and composition of the hydrogenation product obtained were determined as described in Example 1. The results were as follows:

Iodine value: 151
Composition: 6.0% cyclododecane, 89.5% cyclododecene, 4.5% cyclododecadiene, no cyclododecatriene.

Examples 7 to 9

The procedure described in Example 1 was carried out using a reaction temperature of 150° C. but using different palladium catalyst, the reactants and reaction conditions otherwise being the same.

The iodine values and compositions of the hydrogenation product obtained were determined as described in Example 1. The results are shown in the following table:

TABLE 2

| Ex. | Catalyst type | Iodine value | Percent composition ||||
|---|---|---|---|---|---|---|
| | | | Cyclododecane | Cyclododecene | Cyclododecadiene | Cyclododecatriene |
| 7 | 5% Pd on charcoal | 151 | 4.9 | 91.0 | 4.1 | |
| 8 | do | 147 | 6.6 | 90.6 | 2.7 | |
| 9 | 5% Pd/Al₂O₃ | 155 | 8.0 | 82.4 | 7.6 | 2.0 |

These results showed that excellent selectivity of hydrogenation to the mono-ene was achieved using palladium/charcoal and palladium/alumina catalysts.

*Examples 10 to 14*

The procedure described in Example 1 was carried out for comparative purposes only to hydrogenate cis:trans:trans-cyclododeca-1:5:9-triene using catalysts other than a palladium catalyst. The catalysts, reaction temperature, pressure and reaction times are given in Table 3, the procedure and analyses being carried out otherwise as described in Example 1.

TABLE 3

| Ex. | Catalyst | Reaction temperature, °C. | Initial pressure (atmospheres) | Final pressure (atmospheres) | Reaction time (Hours) |
|---|---|---|---|---|---|
| 10 | Cobalt | 100 | 55 | 5 | 16 |
| 11 | Nickel | 100 | 60 | 0 | 16 |
| 12 | do | 150 | 1 | 1 | |
| 13 | Iron | 150 | 80 | 60 | 20 |
| 14 | Copper/silica | 120 | 55 | 0 | 16 |

The iodine values and the compositions of the respective hydrogenation products are given in Table 4.

TABLE 4

| Example | Iodine value | Percent composition | | | |
|---|---|---|---|---|---|
| | | Cyclododecane | Cyclododecene | Cyclododecadiene | Cyclododecatriene |
| 10 | 166 | 24 | 46 | 24 | 7 |
| 11 | 148 | 26 | 51 | 21 | 3 |
| 12 | 156 | 15.5 | 67.5 | 15.8 | 1.1 |
| 13 | 263 | 3 | 4 | 65 | 28 |
| 14 | 166 | 13 | 66 | 18 | 3 |

The results in Table 4 show that catalysts other than palladium lead to only poor selectivity to cyclododecene.

This is true for the use of nickel as catalyst even when this catalyst is employed under the preferred process conditions of the present application.

*Example 15*

324 parts by weight of cis:trans:trans-cyclododeca-1:5:9-triene and 2 parts by weight of the 5% palladium/charcoal (Type 17) catalyst were placed in a reactor, which was then evacuated to remove air and heated to 150° C. Hydrogen gas was then admitted to the reactor until two molar proportions of hydrogen had been taken up per molar proportion of the triene initially present. The pressure in the reactor was maintained at atmospheric pressure throughout the hydrogenation.

The hydrogen supply was then disconnected and the residual hydrogen atmosphere was flushed out of the reactor with a stream of nitrogen. The reactor was then cooled. The catalyst was filtered from the hydrogenation product and iodine value and composition of the filtrate was determined.

The product had iodine value 147 and the following composition as determined by gas/liquid chromatography:

Cyclododecane—8.4%
Cyclododecene—87.2%
Cyclododecadiene—4.4%
Cyclododecatriene—nil.

The above procedure was repeated using the same proportions of reactants and process conditions but effecting the hydrogenation in an autoclave at a pressure within the range of from 10 to 20 atmospheres.

The product had an iodine value of 148 and the following composition as determined by gas/liquid chromatography:

Cyclododecane—11.1%
Cyclododecene—79.1%
Cyclododecadiene—8.8%
Cyclododecatriene—nil.

*Examples 16 to 18*

The procedure described in Example 1 was carried out using the different proportions of palladium in the palladium/charcoal catalyst as set out in Table 5, the hydrogenations being carried out at 150° C. and at atmospheric pressure. The results are given in Table 5, the procedure and analyses being carried out as described in Example 1.

TABLE 5

| Example | Percent Pd on charcoal | Iodine value | Percent composition | | | |
|---|---|---|---|---|---|---|
| | | | Cyclododecane | Cyclododecene | Cyclododecadiene | Cyclododecatriene |
| 16 | 3 | 156 | 8.3 | 82.4 | 8.4 | 0.9 |
| 17 | 5 | 154 | 4.6 | 90.4 | 5.0 | |
| 18 | 10 | 149 | 10.3 | 82.2 | 6.8 | 0.6 |

From the results in Table 5 it can be seen that a palladium content of about 5% of total palladium/charcoal catalyst leads to optimal selectivity to cyclododecene.

*Examples 19 to 25*

The procedure described in Example 1 was carried out for the purposes of comparison only using the various catalysts listed in Table 6, the hydrogenations being carried out at 150° C. and at atmospheric pressure.

The results are given in Table 6, the procedure and analyses being carried out as described in Example 1.

TABLE 6

| Example | Metal; percent metal on charcoal | Iodine value | Percent composition | | | |
|---|---|---|---|---|---|---|
| | | | Cyclododecane | Cyclododecene | Cyclododecadiene | Cyclododecatriene |
| 19 | Pt, 5% | 147 | 31 | 45 | 10 | 14 |
| 20 | Pt, 5% | 153 | 28 | 50 | 9 | 12 |
| 21 | Ru, 5% | 148 | 23 | 58 | 9 | 10 |
| 22 | Ru, 5% | 149 | 22 | 58 | 9 | 11 |
| 23 | Pd/Pt, 5% [1] | 146 | 21 | 61 | 17 | 1 |
| 24 | Pd/Ru, 5% [1] | 149 | 14 | 74 | 13 | 0 |
| 25 | Pt/Ru, 5% [1] | 147 | 24 | 61 | 9 | 7 |

[1] Mixed metals containing 2.5% of each metal.

Again the unsatisfactory selectivities to cyclododecene achieved when catalysts other than palladium are used can be seen from the results in Table 6. It should be noted however that when a portion of the platinum and ruthenium catalysts is replaced by palladium, the use of such mixed catalysts results in substantial increases in selectivity to cyclododecene.

We claim:
1. A process for the production of cyclododecene consisting essentially of heating cyclododecatriene with molecular hydrogen at a temperature in the range of from 130° to 180° C. at atmospheric pressure catalysing the reaction with a palladium hydrogenation catalyst in the absence of a solvent, thereby to obtain a reaction product containing at least 80% by weight of cyclododecene.
2. A process as defined in claim 1 wherein the proportion of molecular hydrogen employed is substantially two molecular proportions per molecular proportion of cyclododecatriene.
3. A process as defined in claim 1 wherein the hydrogenation temperature is about 150° C.
4. A process as defined in claim 1 wherein the catalyst consists of palladium supported on charcoal.
5. A process as defined in claim 4 wherein the proportion of palladium in the palladium/charcoal catalyst is about 5% by weight.

References Cited

UNITED STATES PATENTS

| | | | |
|---|---|---|---|
| 3,022,359 | 2/1962 | Wiese et al. | 260—666 |
| 3,251,892 | 5/1966 | Seefelder | 260—666 |
| 3,285,983 | 11/1966 | Arrigo | 260—666 |
| 3,294,853 | 12/1966 | Arrigo | 260—666 |
| 3,296,320 | 1/1967 | Arrigo | 260—666 |

DELBERT E. GANTZ, *Primary Examiner.*

V. O'KEEFE, *Assistant Examiner.*